US010040137B2

(12) United States Patent
Wu

(10) Patent No.: US 10,040,137 B2
(45) Date of Patent: Aug. 7, 2018

(54) COMPOUND FILLET RADII CUTTER

(71) Applicant: United Technologies Corporation, Hartford, CT (US)

(72) Inventor: Chung Y. Wu, Middletown, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 15/032,016

(22) PCT Filed: Jan. 15, 2015

(86) PCT No.: PCT/US2015/011565
§ 371 (c)(1),
(2) Date: Apr. 25, 2016

(87) PCT Pub. No.: WO2015/116398
PCT Pub. Date: Aug. 6, 2015

(65) Prior Publication Data
US 2016/0256940 A1 Sep. 8, 2016

Related U.S. Application Data

(60) Provisional application No. 61/932,602, filed on Jan. 28, 2014.

(51) Int. Cl.
B23C 5/10 (2006.01)
B23C 3/18 (2006.01)

(52) U.S. Cl.
CPC ............ B23C 5/10 (2013.01); B23C 3/18 (2013.01); B23C 5/1009 (2013.01);
(Continued)

(58) Field of Classification Search
CPC ........... B23C 5/04; B23C 5/10; B23C 5/1009; B23C 2210/084; B23C 2210/086;
(Continued)

(56) References Cited

U.S. PATENT DOCUMENTS 4,596,501 A      6/1986  Wu
4,850,761 A  *   7/1989  Breuer ................. B23C 3/00
                                                    409/132
(Continued)

FOREIGN PATENT DOCUMENTS

DE       3912631 C1 *  3/1990  ............... B23C 5/12

OTHER PUBLICATIONS

International Preliminary Report on Patentability dated Aug. 2, 2016 in Application No. PCT/US2015/012651.
(Continued)

Primary Examiner — Daniel Howell
Assistant Examiner — Yasir Diab
(74) Attorney, Agent, or Firm — Snell & Wilmer LLP

(57) ABSTRACT

A compound fillet radii cutter may have a shaft having a cylindrical member, frustoconical cutting surface, a small radius cutting surface having an arc length of a first circle, and a large radius cutting surface having an arc length of a second circle. The frustoconical cutting surface may be disposed between the cylindrical member and the small radius cutting surface. The small radius cutting surface may be disposed between the frustoconical cutting surface and the large radius cutting surface, and a juncture of the large radius cutting surface and the small radius cutting surface may form a tangential union. In this manner, a single cutter may cut radii of various sizes or cut compound radii.

17 Claims, 3 Drawing Sheets

(52) U.S. Cl.
CPC .. *B23C 2210/084* (2013.01); *B23C 2210/086* (2013.01); *B23C 2222/04* (2013.01); *B23C 2222/64* (2013.01); *B23C 2222/84* (2013.01); *B23C 2222/88* (2013.01); *B23C 2226/125* (2013.01); *B23C 2228/10* (2013.01); *Y10T 409/303808* (2015.01)

(58) Field of Classification Search
CPC ............ B23C 2222/04; B23C 2222/84; B23C 2222/88; B23C 2222/64; Y10T 409/303752; Y10T 409/303808
See application file for complete search history.

(56) References Cited

U.S. PATENT DOCUMENTS

| | | | | |
|---|---|---|---|---|
| 4,968,195 | A * | 11/1990 | Hayakawa | B23C 5/1009 407/54 |
| 5,733,078 | A | 3/1998 | Matsushita et al. | |
| 6,022,175 | A * | 2/2000 | Heinrich | C22C 29/005 407/118 |
| 6,684,742 | B1 | 2/2004 | White | |
| 7,097,540 | B1 * | 8/2006 | Gosinski | B24B 19/14 29/558 |
| 2003/0039547 | A1 * | 2/2003 | Bourgy | B23C 3/18 416/1 |
| 2003/0235479 | A1 * | 12/2003 | Chihara | B23C 3/20 409/132 |
| 2005/0025584 | A1 * | 2/2005 | Kolker | B23C 5/10 407/54 |
| 2005/0274011 | A1 * | 12/2005 | Ouellette | B23C 3/18 29/889.7 |
| 2008/0206000 | A1 * | 8/2008 | Sasu | B23C 3/18 407/29.13 |
| 2009/0246032 | A1 | 10/2009 | Stone et al. | |
| 2010/0143052 | A1 * | 6/2010 | Aoki | B23C 5/10 407/54 |
| 2013/0051939 | A1 | 2/2013 | Wu | |

OTHER PUBLICATIONS

International Search Report and Written Opinion dated Apr. 13, 2015 in Application No. PCT/US2015/011565.
Carbideanddiamondtooling.com (online catalog), "End Mills," http://www.carbideanddiamondtooling.com/end.mill.cutter.high.speed.steel.cobalt, Jul. 2013, 10 pages.

* cited by examiner

COMPOUND FILLET RADII CUTTER

CROSS-REFERENCE TO RELATED APPLICATIONS

This application is U.S. national phase filing under 35 U.S.C. § 371 of PCT/US2015/011565 filed on Jan. 15, 2015 and entitled "COMPOUND FILLET RADII CUTTER," which claims priority from U.S. Provisional Application No. 61/932,602 filed on Jan. 28, 2014 and entitled "COMPOUND FILLET RADII CUTTER." Both of the aforementioned applications are incorporated herein by reference in their entirety.

FIELD

The present disclosure relates to metal cutting systems, and more specifically, to cutters for use in milling and/or SAM (Super Abrasive Machining) systems.

BACKGROUND

Milling/SAM (super abrasive machining) systems often use ball nose cutters to mill a workpiece. Conventionally, a portion of the ball nose of the cutter performs the cutting. Thus, the cutter is often selected to correspond to the smallest feature desired to be produced in the workpiece. Larger features are cut in multiple passes. Moreover, features are often designed according to competing considerations. Accordingly, milling workpieces with features having a variety of sizes requires significant time and cost.

SUMMARY

In various embodiments, a compound fillet radii cutter may include a shaft including a cylindrical member, a frustoconical cutting surface, a small radius cutting surface comprising an arc length of a first circle, and a large radius cutting surface comprising an arc length of a second circle, wherein the frustoconical cutting surface is disposed between the shaft and the small radius cutting surface, and wherein the small radius cutting surface is disposed between the frustoconical cutting surface and the large radius cutting surface, and wherein a juncture of the small radius cutting surface and the large radius cutting surface comprises a tangential union.

In various embodiments, a method of milling may include mounting a cutter to a tool articulator, wherein the cutter may include a shaft having a cylindrical member, a frustoconical cutting surface, a small radius cutting surface comprising an arc length of a first circle, and a large radius cutting surface comprising an arc length of a second circle. The frustoconical cutting surface may be disposed between the shaft having a cylindrical member and the small radius cutting surface. The small radius cutting surface may be disposed between the frustoconical cutting surface and the large radius cutting surface. A juncture of the small radius cutting surface and the large radius cutting surface may be a tangential union, and a radius of the first circle may be smaller than a radius of the second circle. The method may further include positioning the cutter above a workpiece, spinning the cutter about a centerline, moving the tool articulator whereby the cutter is positioned so that the small radius cutting surface contacts the workpiece, and translating the tool articulator whereby the cutter translates while maintaining contact with the workpiece.

In various embodiments, a compound fillet radii cutter may include a frustoconical cutting surface, a first radius cutting surface having an first arc length of a first circle with a first radius, wherein the first radius cutting surface is disposed between the frustoconical cutting surface and a second radius cutting surface, and a second radius cutting surface having a second arc length of a second circle with a second radius.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
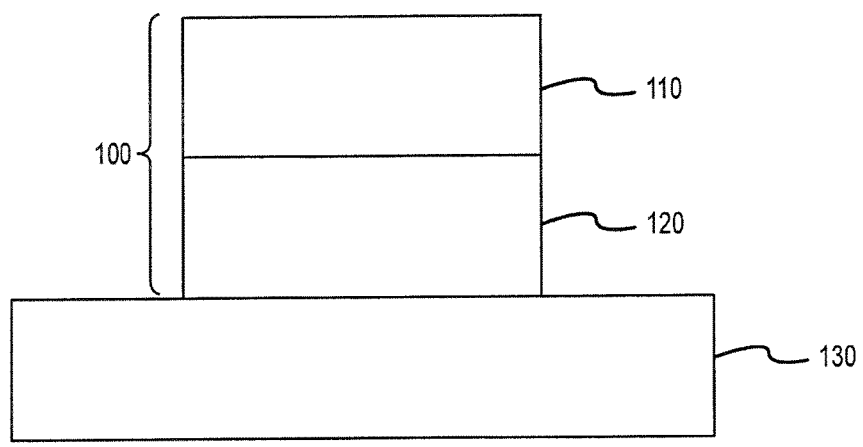
FIG. 1 illustrates various aspects of a milling system, in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably.

In various embodiments, a workpiece may be desired to be cut having a variety of feature sizes. For example, a gas turbine engine may comprise rotor fans wherein rotor fans are desired to be milled from a single piece of material. A rotor fan may have a rotor hub and at least one rotor blade. Aerodynamically, a small fillet radius between the rotor hub and the rotor blade may be desirable. Structurally, a large fillet radius between the rotor hub and the rotor blade may be desirable. Thus, in various embodiments, a variable fillet shape may be desired to be milled in order to satisfy both aerodynamic and structural considerations.

In various embodiments, a milling system may comprise a tool articulator, a cutter, wherein the cutter is positioned by the tool articulator, and may be adapted to accept a workpiece wherein the cutter removes material from the workpiece to shape the workpiece into a desired product or part. For example, with reference to FIG. 1, a milling system 100 may comprise a tool articulator 110 and a cutter 120, with the milling system 100 adapted to accept a workpiece 130. In various embodiments, the tool articulator 110 comprises a milling machine. For example, the tool articulator 110 may comprise a point milling machine, or a flank milling machine, or may comprise a super abrasive machining (SAM) machine, or may comprise any milling machine capable of any milling technique, or may comprise a machine capable of multiple milling and/or machining techniques.

In various embodiments, a cutter 120 may comprise a compound fillet radii cutter. For example, with reference to FIGS. 1 and 2, a cutter 120 may comprise a compound fillet radii cutter 200. Alternatively, with reference to FIGS. 1 and 3, a cutter 120 may comprise a notched compound fillet radii cutter 300.

In various embodiments, a workpiece 130 may comprise any material desired to be shaped into a product or part. For example, in various embodiments, a workpiece 130 may comprise aluminum, steel, titanium, or nickel alloy. For example, a workpiece may comprise an aluminum blank, a steel blank, a titanium blank, a billet material, and/or any other material from which a product or part may be formed.

In various embodiments, a compound fillet radii cutter may comprise a shaft, a frustoconical cutting surface, a small radius cutting surface, and a large radius cutting surface. For example, with reference to FIG. 2, a compound fillet radii cutter 200 may comprise a shaft 210, a frustoconical cutting surface 214, a small radius cutting surface 218, and a large radius cutting surface 216.

In various embodiments, a shaft 210 may comprise a cylindrical portion which may be symmetric about a centerline 228. Moreover, a shaft 210 may comprise a square sided portion, a trapezoidal portion, a pentagonal portion, a six sided portion, a seven sided portion, an eight sided portion, or any geometry portion which may be symmetric about a centerline 228. Furthermore, a shaft 210 may comprise an angle 212 at which the shaft transitions from a cylindrical portion to a frustoconical cutting surface 214. In this manner, the compound fillet radii cutter 200 may be employed, for example, in the flank milling of complex rotor blade surfaces, the complex variable fillet radius region, flat features, and, for example, the rotor hub surface.

In various embodiments, a compound fillet radii cutter may comprise a frustoconical cutting surface 214. For example, with reference to FIG. 2, a compound fillet radii cutter may comprise a shaft 210 wherein the shaft 210 transitions from a cylindrical portion at angle 212 to a frustoconical cutting surface 214. Frustoconical cutting surface 214 may further transition to a small radius cutting surface at a small radii first point 224.

Moreover, in various embodiments, a compound fillet radii cutter may comprise a small radius cutting surface. For example, with reference to FIG. 2, a compound fillet radii cutter 200 may comprise a small radius cutting surface 218. Small radius cutting surface 218 may comprise an arc length of a circle having a radius 222 extending from a small radii first point 224 to a small radii second point 226. Small radius cutting surface 218 may be positioned so that the arc length of a circle having a radius 222 joins tangentially at small radii first point 224 to frustoconical cutting surface 214. Moreover, small radius cutting surface 218 may be positioned so that an arc length of a circle having a radius 222 joins tangentially at small radii second point 226 to the large radius cutting surface 216 (discussed further herein). In this regard, the transition between frustoconical cutting surface 214 and small radius cutting surface 218 may be non-discontinuous, for example, at the tangential union of the frustoconical cutting surface 214 and small radius cutting surface 218, wherein the tangential union lies at small radii first point 224.

Furthermore, in various embodiments, a compound fillet radii cutter may comprise a large radius cutting surface. For example, with reference to FIG. 2, a compound fillet radii cutter 200 may comprise a large radius cutting surface 216. Large radius cutting surface 216 may comprise an arc length of a circle having a radius 217. The radius 217 may be greater than the radius 222. The large radius cutting surface 216 may be positioned so that the arc length of a circle having a radius 217 joins tangentially at the small radii second point 226 to the small radius cutting surface 218. In this regard, the transition between small radius cutting surface 218 and large radius cutting surface 216 may be non-discontinuous, for example, at the tangential union of the small radius cutting surface 218 and the large radius cutting surface 216, wherein the tangential union lies at small radii second point 226. In this manner, the juncture of the large radius cutting surface 216 and the small radius cutting surface 218 may comprise a tangential union. Thus, in various embodiments, the profile of the tip of the compound fillet radii cutter may approximate a portion of an ellipsoid.

In various embodiments, small radius cutting surface 218 and large radius cutting surface 216 are positioned so that the surfaces do not join at a tangential union, but join at a local discontinuity. For example, small radius cutting surface 218 may have the same radius as large radius cutting surface 216, so that the cutting surfaces appear to be mirrors of one another, translated about small radius second point 226. Moreover, a compound fillet radii cutter may comprise three or more radiused cutting surfaces, or any number of radiused cutting surfaces. Furthermore, a compound fillet radii cutter may comprise any number or configuration of cutting surfaces joined tangentially or at local discontinuities, or in a combination of manners. In this regard, a compound fillet radii cutter may comprise any number and arrangement of cutting surfaces joined at angles, or tangents, or having various arc lengths, for example resembling multiple semicircles inscribed circumferentially about a larger circle.

In various embodiments, a notched compound fillet radii cutter may comprise a shaft, a frustoconical cutting surface, a small radius cutting surface, a large radius cutting surface, and a tip notch. For example, with reference to FIG. 3, a notched compound fillet radii cutter 300 may comprise a shaft 310, a frustoconical cutting surface 314, a small radius cutting surface 318, a large radius cutting surface 316, and a tip notch 302.

In various embodiments, a shaft 310 may comprise a cylindrical portion which may be symmetric about a centerline 328. For example, a shaft 310 may comprise an angle 312 at which shaft transitions from a cylindrical portion to a frustoconical cutting surface 314. In this manner, the notched compound fillet radii cutter 300 be employed, for example, in the flank milling of complex rotor blade surfaces, the complex variable fillet radius region, flat features, and, for example, the rotor hub surface.

In various embodiments, a notched compound fillet radii cutter may comprise a frustoconical cutting surface 314. For example, with reference to FIG. 3, a notched compound fillet radii cutter may comprise a shaft 310 wherein the shaft 310 transitions from a cylindrical portion at angle 312 to a frustoconical cutting surface 314. Frustoconical cutting surface 314 may further transition to a small radius cutting surface at a small radii first point 324.

Moreover, in various embodiments, notched compound fillet radii cutter may comprise a small radius cutting surface. For example, with reference to FIG. 3, a notched compound fillet radii cutter 300 may comprise a small radius cutting surface 318. Small radius cutting surface 318 may comprise an arc length of a circle having a radius 322 extending from a small radii first point 324 to a small radii second point 326. Small radius cutting surface 318 may be positioned so that the arc length of a circle having a radius 322 joins tangentially at small radii first point 324 to the frustoconical cutting surface 314. Moreover, small radius cutting surface 318 may be positioned so that the arc length of a circle having a radius 322 joins tangentially at small radii second point 326 to the large radius cutting surface 316 (discussed further herein). In this regard, the transition between frustoconical cutting surface 314 and small radius cutting surface 318 may be non-discontinuous, for example, at the tangential union of the frustoconical cutting surface 314 and small radius cutting surface 318, wherein the tangential union lies at small radii first point 324. In this manner, the juncture of the large radius cutting surface 316 and the small radius cutting surface 318 may comprise a tangential union.

Furthermore, in various embodiments, notched compound fillet radii cutter may comprise a large radius cutting surface. For example, with reference to FIG. 3, a notched compound fillet radii cutter 300 may comprise a large radius cutting surface 316. Large radius cutting surface 316 may comprise an arc length of a circle having a radius 304. The radius 304 may be greater than the radius 322. The large radius cutting surface 316 may be positioned so that the arc length of a circle having a radius 304 joins tangentially at the small radii second point 326 to the small radius cutting surface 318. In this regard, the transition between small radius cutting surface 318 and large radius cutting surface 316 may be non-discontinuous, for example, at the tangential union of the small radius cutting surface 318 and the large radius cutting surface 316, wherein the tangential union lies at small radii second point 326.

In various embodiments, small radius cutting surface 318 and large radius cutting surface 316 are positioned so that the surfaces do not join at a tangential union, but join at a local discontinuity. For example, small radius cutting surface 318 may have the same radius as large radius cutting surface 316, so that the cutting surfaces appear to be mirrors of one another, translated about small radius second point 326. Moreover, a notched compound fillet radii cutter may comprise three or more radiused cutting surfaces, or any number of radiused cutting surfaces. Furthermore, a notched compound fillet radii cutter may comprise any number or configuration of cutting surfaces joined tangentially or at local discontinuities, or in a combination of manners. In this regard, a notched compound fillet radii cutter may comprise any number and arrangement of cutting surfaces joined at angles, or tangents, or having various arc lengths, for example resembling multiple semicircles inscribed circumferentially about a larger circle.

In various embodiments, notched compound fillet radii cutter may comprise a tip notch. For example, with reference to FIG. 3, a notched compound fillet radii cutter 300 may comprise a tip notch 302. Tip notch 302 may lie substantially centered on centerline 328. In various embodiments, tip notch 302 may comprise a discontinuous portion of the arc length of the large radius cutting surface 316. For example, large radius cutting surface 316 may be discontinuous at notch edge 305. Notch edge 305 may comprise a sidewall of a cavity extending into the body of notched compound fillet radii cutter 300. In various embodiments, the cavity is cylindrical about centerline 328. In various embodiments, notch edge 305 may comprise a sidewall of a cavity extending into the body of notched compound fillet radii cutter and terminating in a cavity floor 303. In this regard, a tip notch may comprise a cylindrical aperture disposed in the center of the large radius cutting surface 316, extending inwardly along centerline 328 and terminating at cavity floor 303. Thus, in various embodiments, the profile of the tip of the compound fillet radii cutter may approximate a portion of an ellipsoid having a notch removed.

Now having described various aspects of cutters, a cutter may be manufactured from various materials. In various embodiments, various components of machining systems, for example, compound fillet radii cutters and notched compound fillet radii cutters may be manufactured from various materials. For example, a cutter may comprise a carbide material, for example, silicone carbide. In various embodiments, a cutter may comprise a coating, for example a cubic boron nitride (CBN) coating, or a micro grain carbide coating, or a diamond coating, or any other coating adapted to effect a desired material property, for example, improved roughness.

Moreover, in various embodiments, various components of cutters may comprise other materials, for example, ceramic, titanium, tungsten, aluminum, alloys, or stainless steel, though they may further comprise numerous other materials configured to provide mechanical resiliency and/or support of the system when subjected to wear in an operating environment or to satisfy other desired electromagnetic, chemical, physical, or biological properties such as abrasiveness, hardness, strength, durability, ductility, heat tolerance, thermal dissipation, and footprint constraints, among others. In various embodiments, various portions of cutters as disclosed herein are made of different materials or combinations of materials, and/or may comprise coatings, for example diamond or micro grain carbide, or cubic boron nitride (CBN).

In various embodiments, the present disclosure provides a milling/SAM system with improved wear tolerance, and an ability to cut diverse shapes of varied feature sizes with decreased pass count.

Now, having described various aspects of cutters and various materials from which cutters may be manufactured, a cutter may be used according to various methods. For example, with reference to FIG. 1, a cutter 120 may be mounted to a tool articulator 110. The tool articulator 110 may spin the cutter 120.

Figure 2:
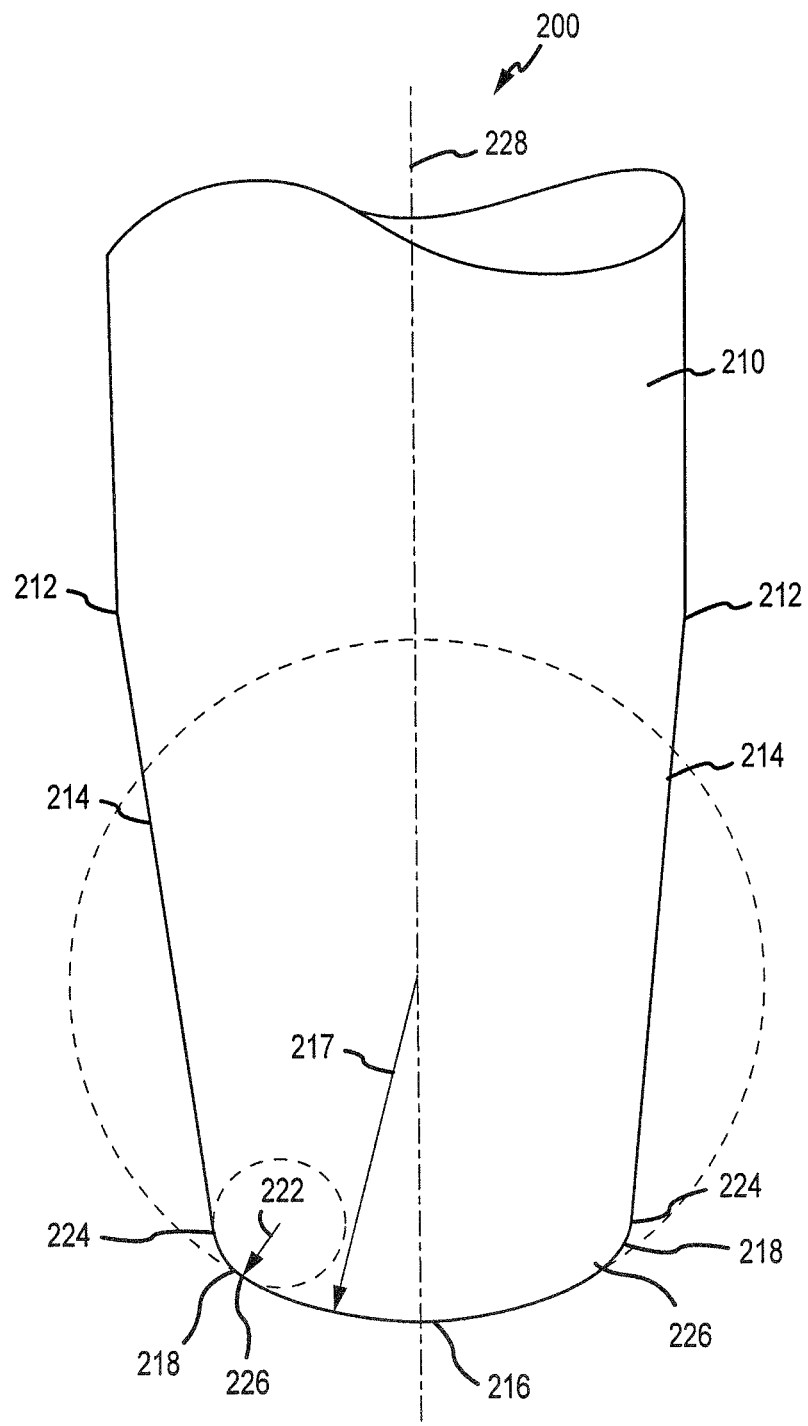
FIG. 2 illustrates various aspects of a compound fillet radii cutter, in accordance with various embodiments.

For example, with reference to FIGS. 1 and 2, a cutter 120 may comprise a compound fillet radii cutter 200 such that tool articulator 110 spins the compound fillet radii cutter about centerline 228. For further example, with reference to FIGS. 1 and 3, a cutter 120 may comprise a notched compound fillet radii cutter 300 such that the tool articulator 110 spins the notched compound fillet radii cutter about centerline 328.

The tool articulator 110 may position the cutter so that the cutter 120 contacts the workpiece 130 and cuts a portion of the workpiece 130 in order to form the workpiece 130 into a desired part or product. For example, with reference to FIGS. 1 and 2, the tool articulator 110 may position the compound fillet radii cutter 200 so that small radius cutting surface 218 cuts small radius sections from workpiece 130, and/or so that large radius cutting surface 216 cuts large radius sections from workpiece 130. Moreover, the tool articulator 110 may position the compound fillet radii cutter 200 so that the small radius cutting surface 218 and/or large radius cutting surface 216 and/or frustoconical cutting surface 214 may cut sections from workpiece 130 simultaneously. Moreover, the tool articulator 110 may position the compound fillet radii cutter so that the frustoconical cutting surface 214 may cut relatively flat (i.e., non-radiused, such as rotor blade surface) sections from workpiece 130. In this regard, compound fillet radii cutter 200 may cut compound radius sections, sections of variable radius, non-radiused sections, and sections of different radii from workpiece 130.

Figure 3:
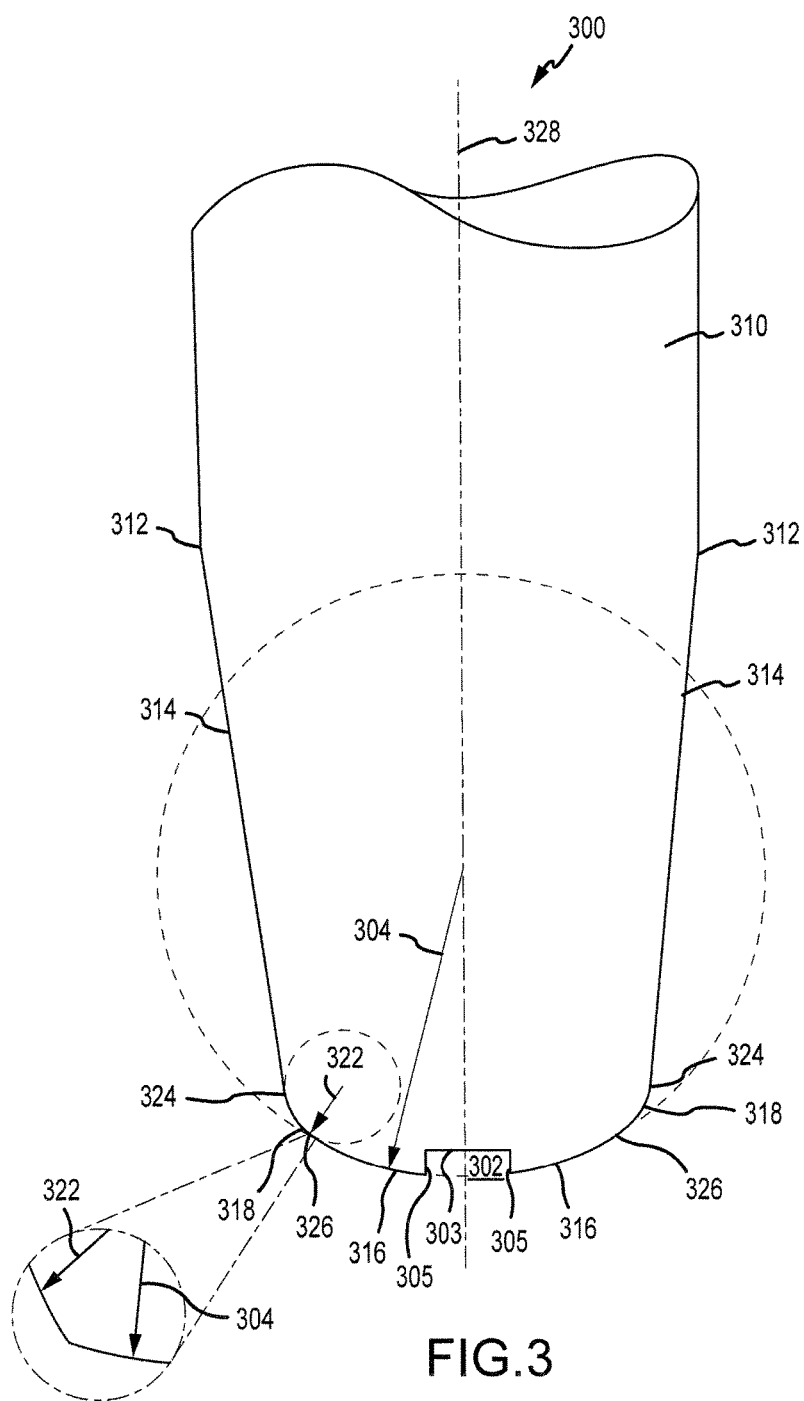
FIG. 3 illustrates various aspects of a notched compound fillet radii cutter, in accordance with various embodiments.

For example, with reference to FIGS. 1 and 3, the tool articulator 110 may position the notched compound fillet radii cutter 300 so that small radius cutting surface 318 cuts small radius sections from workpiece 130, and/or so that large radius cutting surface 316 cuts larger radius sections from workpiece 130. Moreover, the tool articulator 110 may position the notched compound fillet radii cutter 300 so that the small radius cutting surface 318 and/or large radius cutting surface 316 and/or frustoconical cutting surface 314 may cut sections from workpiece 130 simultaneously. Moreover, the tool articulator 110 may position the notched compound fillet radii cutter 300 so that the frustoconical cutting surface 314 may cut relatively flat (i.e., non-radiused) sections from workpiece 130. In this regard, the notched compound fillet radii cutter may cut compound radius sections, sections of variable radius, non-radiused sections, and sections of different radii from workpiece 130.

Moreover, the tip notch 302 may enhance wear resistance and/or cutting performance, by causing the region near centerline 328 of notched compound fillet radii cutter 300 to not contact the workpiece 130. This region of notched compound fillet radii cutter 300 may move with significant angular velocity but minimal linear velocity, for example, in the event that the tool articulator 110 positions the cutter 120 relatively stationary while spinning, or translates the cutter 120 relatively slowly while spinning. As a result, cutter 120 may exhibit significant wear and/or diminished cutting performance may occur in this area near centerline 328 in some scenarios in the absence of a tip notch 302. Accordingly, in various embodiments, a tip notch 302 may be formed in a notched compound fillet radii cutter 300 such that the region near centerline 328 does not contact the workpiece 130. In various embodiments, the diameter of the notch is 0.05 inches (1.27 mm), although any diameter or dimension notch selected to provide desirable operational characteristics as discussed herein, may be implemented.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A compound fillet radii cutter comprising:
a shaft;
a linear frustoconical cutting surface, wherein a constant angle is disposed between the shaft and the linear frustoconical cutting surface;
a small radius cutting surface comprising an arc length of a first circle; and
a large radius cutting surface comprising an arc length of a second circle,
wherein the linear frustoconical cutting surface is disposed along the constant angle between the shaft and the small radius cutting surface,
wherein the small radius cutting surface is disposed between the linear frustoconical cutting surface and the large radius cutting surface,
wherein a juncture of the small radius cutting surface and the large radius cutting surface comprises a tangential union, and
wherein a profile of a tip of the compound filet radii cutter resembles an ellipsoid.

2. The compound fillet radii cutter according to claim 1, wherein a radius of the first circle is smaller than a radius of the second circle.

3. The compound fillet radii cutter according to claim 1, wherein the shaft comprises a cylindrical member.

4. The compound fillet radii cutter according to claim 1, wherein the shaft and the linear frustoconical cutting surface are both symmetric about a centerline.

5. The compound fillet radii cutter according to claim 1, wherein the linear frustoconical cutting surface is cylindrical.

6. The compound fillet radii cutter according to claim 1, further comprising a tip notch wherein the tip notch comprises an aperture disposed in center of the large radius cutting surface.

7. The compound fillet radii cutter according to claim 1, further comprising a tip notch wherein the tip notch comprises a cylindrical aperture in the large radius cutting surface extending inwardly along a centerline and terminating in a cavity floor.

8. The compound fillet radii cutter according to claim 1, wherein the cutter comprises a coating.

9. The compound fillet radii cutter according to claim 8, wherein the coating comprises cubic boron nitride.

10. The compound fillet radii cutter according to claim 1, wherein the cutter comprises microcarbide.

11. A method of milling a workpiece comprising:
mounting a cutter to a tool articulator, wherein the cutter comprises:
a shaft;
a linear frustoconical cutting surface, wherein a constant angle is disposed between the shaft and the linear frustoconical cutting surface;
a small radius cutting surface comprising an arc length of a first circle; and
a large radius cutting surface comprising an arc length of a second circle,
wherein the linear frustoconical cutting surface is disposed along the constant angle between the shaft and the small radius cutting surface,
wherein the small radius cutting surface is disposed between the linear frustoconical cutting surface and the large radius cutting surface,
wherein a juncture of the small radius cutting surface and the large radius cutting surface comprises a tangential union,
wherein a radius of the first circle is smaller than a radius of the second circle; positioning the cutter above a workpiece, and
wherein a profile of a tip of the compound filet radii cutter resembles an ellipsoid; spinning the cutter about a centerline;
moving the tool articulator whereby the cutter is positioned so that the small radius cutting surface contacts the workpiece; and
translating the tool articulator whereby the cutter translates while maintaining contact with the workpiece.

12. A method according to claim 11, further comprising moving the tool articulator whereby the cutter is positioned so that the large radius cutting surface contacts the workpiece.

13. A method according to claim 11, further comprising moving the tool articulator whereby the cutter is positioned so that the linear frustoconical cutting surface of the cutter contacts the workpiece.

14. A method according to claim 11, wherein the workpiece comprises at least one of: aluminum, steel, titanium, or nickel alloy.

15. A method according to claim 11, wherein the large radius cutting surface and the small radius cutting surface contact the workpiece simultaneously.

16. A method according to claim 11, wherein the small radius cutting surface and the linear frustoconical cutting surface contact the workpiece simultaneously.

17. A compound fillet radii cutter comprising:
a shaft;
a linear frustoconical cutting surface, wherein a constant angle is disposed between the shaft and the linear frustoconical cutting surface;
a first radius cutting surface comprising an first arc length of a first circle having a first radius;
a second radius cutting surface comprising a second arc length of a second circle having a second radius that is the same as the first radius such that the first radius cutting surface is a mirror image of the second radius cutting surface translated about a point,
wherein the first radius cutting surface is disposed between the linear frustoconical cutting surface and the second radius cutting surface, and
wherein a juncture of the first radius cutting surface and the second radius cutting surface comprises a local disconnect.

* * * * *